United States Patent
Wu et al.

(10) Patent No.: US 10,831,554 B2
(45) Date of Patent: Nov. 10, 2020

(54) COHESIVE CLUSTERING IN VIRTUALIZED COMPUTING ENVIRONMENT

(71) Applicant: VMware, Inc., Palo Alto, CA (US)

(72) Inventors: Xiaojin Wu, Shanghai (CN); Ping Chen, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 113 days.

(21) Appl. No.: 15/709,489

(22) Filed: Sep. 20, 2017

(65) Prior Publication Data
US 2019/0087234 A1    Mar. 21, 2019

(51) Int. Cl.
| | |
|---|---|
| *G06F 15/173* | (2006.01) |
| *G06F 9/50* | (2006.01) |
| *G06F 9/455* | (2018.01) |
| *G06F 3/06* | (2006.01) |
| *G06F 9/48* | (2006.01) |

(52) U.S. Cl.
CPC ............ *G06F 9/5077* (2013.01); *G06F 3/061* (2013.01); *G06F 3/067* (2013.01); *G06F 3/0631* (2013.01); *G06F 3/0664* (2013.01); *G06F 9/455* (2013.01); *G06F 9/45558* (2013.01); *G06F 9/4856* (2013.01); *G06F 2009/45579* (2013.01); *G06F 2009/45591* (2013.01); *G06F 2209/505* (2013.01)

(58) Field of Classification Search
CPC . G06F 2009/45579; G06F 2009/45591; G06F 2209/505; G06F 9/455; G06F 9/45558; G06F 9/4856; G06F 9/5077
See application file for complete search history.

(56) References Cited

U.S. PATENT DOCUMENTS

| | | | | |
|---|---|---|---|---|
| 8,650,564 | B2 * | 2/2014 | Huang | G06F 9/45533 714/12 |
| 9,037,719 | B2 * | 5/2015 | Shen | H04L 67/1002 709/226 |
| 9,141,625 | B1 * | 9/2015 | Thornewell | G06F 16/119 |
| 10,284,381 | B1 * | 5/2019 | Weiner | H04L 12/18 |
| 2010/0094970 | A1 * | 4/2010 | Zuckerman | H04L 67/1008 709/219 |
| 2015/0143364 | A1 * | 5/2015 | Anderson | G06F 9/5088 718/1 |
| 2015/0319230 | A1 * | 11/2015 | Skjolsvold | G06F 16/835 709/224 |

\* cited by examiner

*Primary Examiner* — John B Walsh
*Assistant Examiner* — Dixon F Dabipi
(74) *Attorney, Agent, or Firm* — SU IP Consulting

(57) ABSTRACT

An example method to provide a storage service in a virtualized computing environment may include obtaining network latency information associated with various hosts in the virtualized computing environment. In response to identifying a first network latency value that exceeds a threshold, wherein the first network latency is between the first host and a second host in the virtualized computing environment, the method includes placing the second host in a first cohesive cluster consisting of the second host. In response to identifying a second network latency value being less than or equal to the threshold, wherein the second network latency value is between the first host and a third host in the virtualized computing environment, the method includes grouping the first host and the third host in a second cohesive cluster. The method includes initiating configuration of resources in the first cohesive cluster and the second cohesive cluster to support the storage service.

20 Claims, 4 Drawing Sheets

COHESIVE CLUSTERING IN VIRTUALIZED COMPUTING ENVIRONMENT

BACKGROUND

Unless otherwise indicated herein, the approaches described in this section are not admitted to be prior art by inclusion in this section.

In a virtualized computing environment, by abstracting the underlying hardware resources, software-defined storage services may be dynamically composed, aligned on application boundaries, and driven by policy. For example, multiple hosts may form a cluster to provide a unified storage service to one or more applications as one or more virtual disks. One conventional host clustering approach is k-means clustering. Using k-means clustering, n hosts may be partitioned into k predetermined clusters. In a first of the k clusters, a central point associated with a parameter of a specific host in the first cluster is iteratively calculated and identified. With this central point, the first cluster is then dynamically formed based on the distances between the central point and other points corresponding to the parameter of other hosts. However, given the iterative nature of such an approach, performing k-means clustering can consume significant amount of resources. Moreover, k-means clustering treats all the hosts equally without taking into account where virtualized disks are physically located. In a large scale deployment environment, the network latency associated with each host may vary significantly. When a virtual disk of a virtual machine is mapped to a physical disk on a first host with high network latency but the compute resource for the virtual machine is located on a second host, the delay for the compute resource to receive the needed storage service may become unacceptable.

Thus, an improved approach to perform cohesive clustering is needed.

DETAILED DESCRIPTION

Figure 1:
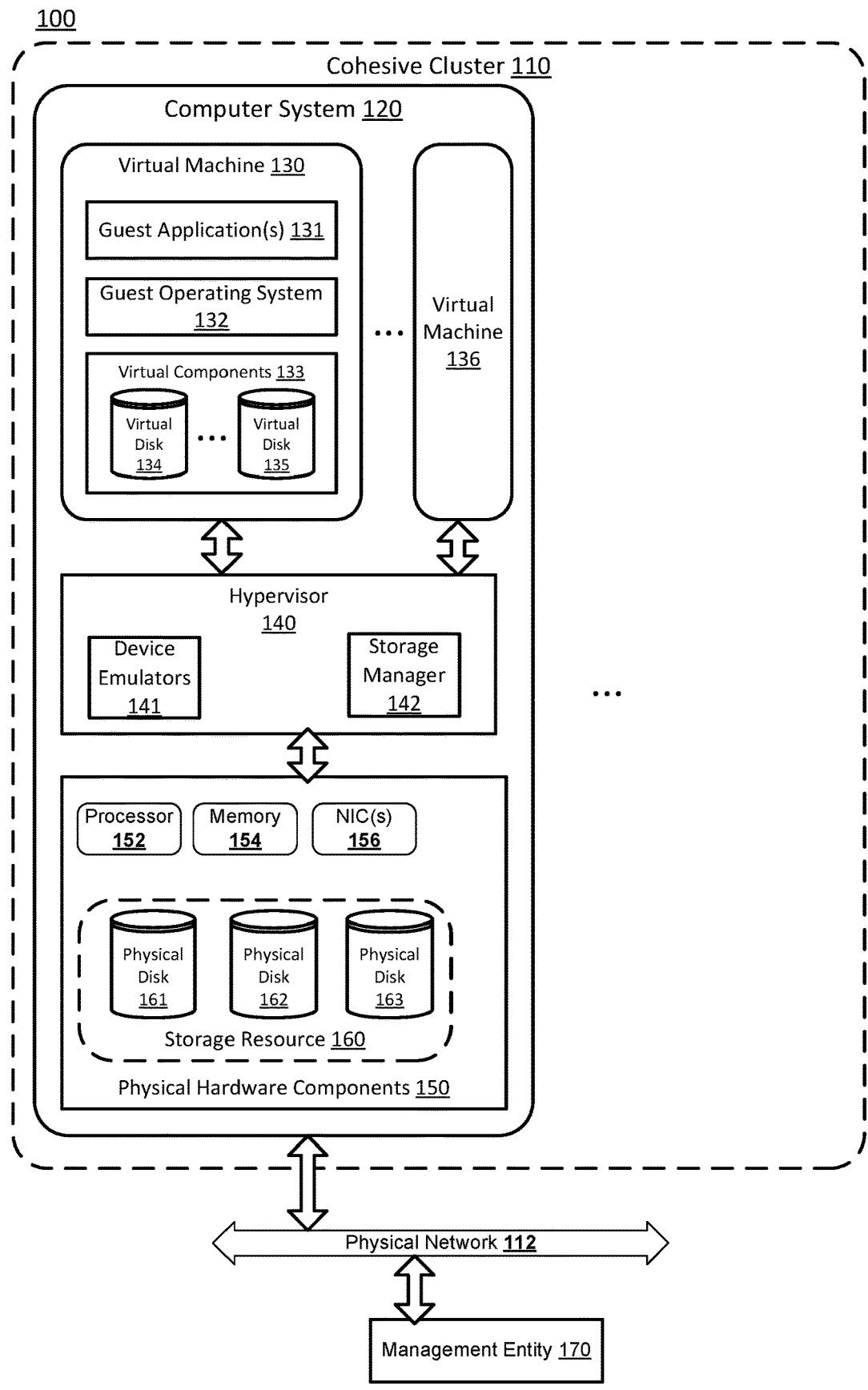
FIG. 1 illustrates a virtualized computing environment including a cohesive cluster, according to one or more embodiments of the present disclosure.

The following detailed description refers to the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made without departing from the spirit or scope of the subject matter presented here. Aspects of the present disclosure, as generally described herein, and illustrated in the Figures, can be arranged, substituted, combined, and designed in a wide variety of different configurations.

In the present disclosure, a "virtual machine" running on a host is one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include namespace containers, such as provided by Docker®, (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system. A "host" (also known as "computer system," "host computers," "host devices," "physical servers," "server systems," etc.) generally refers to the underlying hardware that provides various computing resources. A "cohesive cluster" refers to a group of hosts that satisfy a predefined cohesion parameter. One example of a cohesion parameter may be the network latency for one host to communicate with another host.

FIG. 1 illustrates virtualized computing environment 100 including cohesive cluster 110, according to one or more embodiments of the present disclosure. In the example illustrated in FIG. 1, cohesive cluster 110 includes one or more computer systems 120 connected via physical network 112. In some embodiments, cohesive cluster 110 provides storage services in virtualized computing environment 100. More specifically, in some embodiments, one or more storage objects (e.g., virtual disk) in a software defined storage instance may be mapped to physical storage resources in cohesive cluster 110 in which the compute resource is also located, instead of other hosts in virtualized computing environment 100. In some embodiments, cohesive cluster 110 may include multiple computer systems 120 (only one is shown in FIG. 1 for simplicity) that all satisfy a certain network latency requirement.

In some embodiments, network latency information between computer systems 120 may be monitored by management entity 170, such as VMware vCenter Server®. Management entity 170 may monitor, among other things, network latency between computer systems 120. Management entity 170 may be implemented using physical machine(s), virtual machine(s), or both.

Any computer system 120 includes physical hardware components 150 and hypervisor 140 to support one or more virtual machines (VMs), such as VM 130 and VM 136. Throughout the present disclosure, the term "hypervisor" may refer to any suitable computer hardware virtualization software that enables multiple virtual machines to execute simultaneously on a single host, such as VMware ESX® (available from VMware, Inc.). In practice, any computer system 120 may support tens or hundreds of virtual machines (two are shown in FIG. 1 for simplicity).

In some embodiments, computer system 120 may be configured with various physical hardware components 150 including, without limitation, one or more physical Central Processing Units (CPUs) 152, memory 154, Network Interface Card (NIC) 156, and/or additional electronic circuit components (not shown in FIG. 1). Physical hardware components 150 may also include storage resource 160 having multiple physical disks 161, 162, and 163. Any of the physical disks 161, 162, and 163 may be a physical device having storage medium for data storage and data access. For example, a physical disk may be rotational hard drive using platters as storage mediums, a SSD-based device using flash-based memory, or a RAM-based storage medium. Physical disks 161, 162 and 163 in storage resource 160 may provide various data storage services for one or more workload on computer system 120.

VM 130 and VM 136 each represent a software implementation of a physical machine. Hypervisor 140 maintains a mapping between underlying physical hardware components 150 and virtual components 133 allocated to VM 130 and the 136. Corresponding to physical hardware components 150, virtual components 133 may include virtual CPU, virtual memory, virtual network interface controller (vNIC), virtual disks 134 and 135, etc. Physical hardware components 150 may be emulated using device emulator 141 implemented by hypervisor 140.

Guest operating system (OS) 132 and guest application(s) 131 may be installed and executed on the top of virtual components 133. Guest OS 132 may be a desktop operating system such as, without limitation, WINDOWS®, Apple OS®, Chrome®, Linux, or UNIX. Guest OS 132 may also be a mobile operating system such as, without limitation, Android®, or iOS®. From the perspectives of guest OS 132 and guest application(s) 131, virtual components 133, such as the virtual disks 134 and 135, may operate substantially the same as the physical disks having similar capacities in physical hardware components 150.

In some embodiments, hypervisor 140 may include storage manager 142, which configures, manages, and monitors virtual disks 134 and 135 as well as the storage resource 160, such as the physical hard disks 161, 162, and 163. Specifically, storage manager 142 may manage the creation, access, and deletion of virtual disks 134 and 135. For example, storage manager 142 may utilize one or more virtual machine disk (VMDK) files to implement virtual disk 134 or 135. Each VMDK file may be associated with a specific virtual disk and may look like a typical file in a file system. Storage manager 142 may convert the storage operations (e.g., read, write) performed on virtual disks 134 and 135 to operations performed on the associated VMDK files. Further, storage manager 142 may utilize compute resources provided by processor 152 to manipulate (e.g., copy, move, insert, append, cut, split, or merge) the VMDK files as any other files stored in physical disks 161, 162, and 163 in cohesive cluster 110, instead of other physical disks in virtualized computing environment 100.

The various terms, layers and categorizations used to describe the virtualization components in FIG. 1 may be referred to differently without departing from their functionalities or the spirit and scope of the present disclosure. For example, one or more of the hypervisor 140 and its modules such as device emulators 141 and storage manager 142 may be implemented in another computer system, distinct from the computer system 120 that supports the VM 130 and the virtual components 133. Also, through storage virtualization, the storage resource 160 in each computer system 120 may be aggregated to form a distributed storage system, which represents a shared pool of storage resources. Such a distributed storage system may employ any suitable technology, such as Virtual Storage Area Network (VSAN) from VMware, Inc.

Figure 2A:
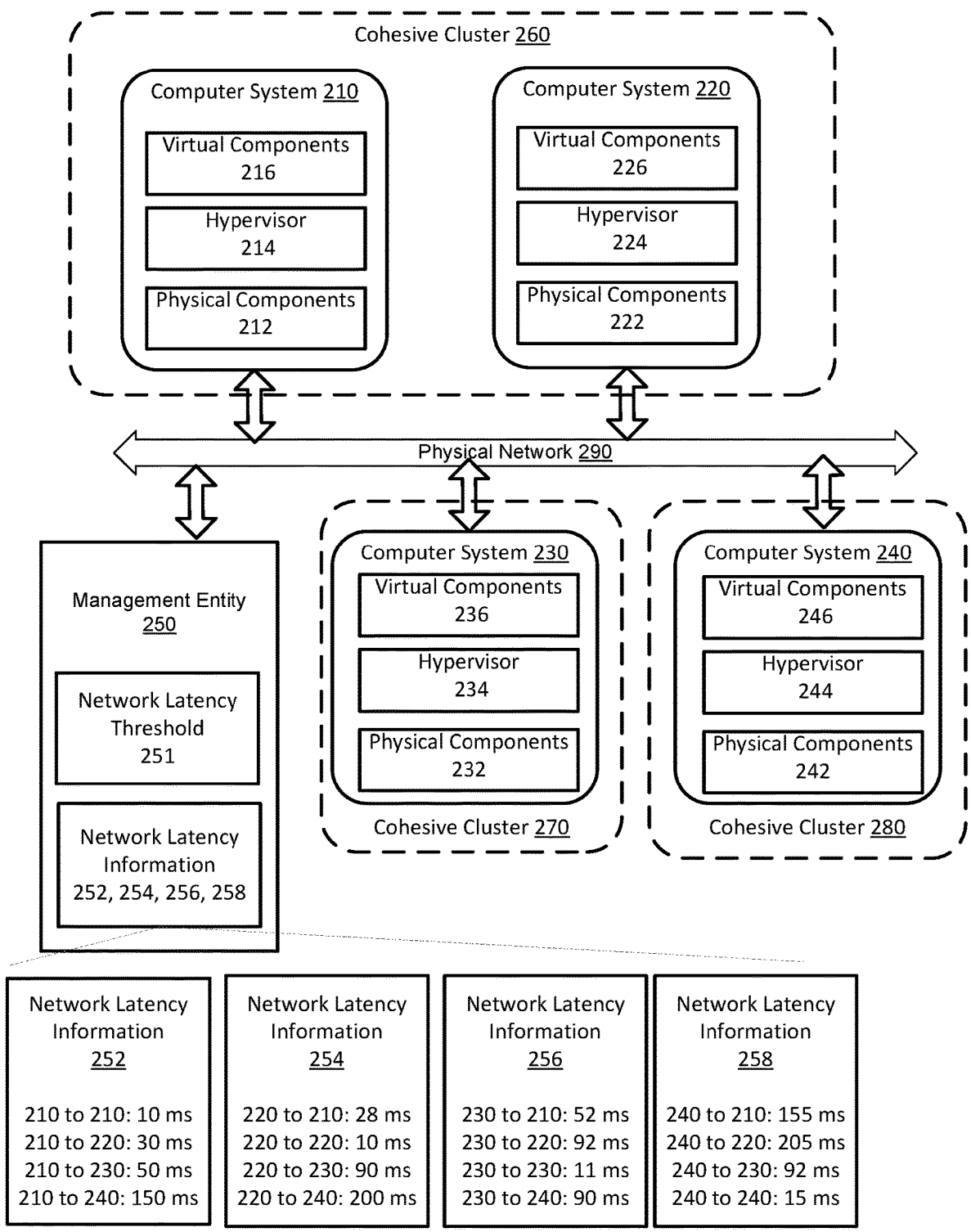
FIG. 2A illustrates a virtualized computing environment including multiple computer systems grouped in different cohesive clusters, according to one or more embodiments of the present disclosure.

FIG. 2A illustrates virtualized computing environment 200 including multiple computer systems 210, 220, 230, and 240 belonging to multiple cohesive clusters 260, 270 and 280, according to one or more embodiments of the present disclosure. In some embodiments, any of computer systems 210, 220, 230, and 240 may correspond to computer system 120 as set forth above. Computer systems 210, 220, 230, and 240 may communicate with each other via physical network 290. Any computer system 210, 220, 230, and 240 may include corresponding physical components (212, 222, 232, 242), hypervisors (214, 224, 234, 244), and virtual components (216, 226, 236, 246). In some embodiments, any physical components 212, 222, 232, 242 may include physical compute resources (e.g., processing unit) and physical storage resources (e.g., physical disks). Virtual components 216, 226, 236, and 246 may include virtual processing units, virtual disks, etc. Hypervisor 214, 224, 234, and 244 may aggregate these physical resources to create virtual components 216, 226, 236, and 246 for the VMs run on computer systems 210, 220, 230, and 240.

In some embodiments, computer systems are grouped into different cohesive clusters according to one or more predefined cohesion parameters. In FIG. 2, one example cohesion parameter is the network latency among the computer systems. In one example cohesive cluster, a network latency between any two computer systems in the cohesive cluster is less than or equal to a predefined network latency.

In some embodiments, the network latency experienced by a source computer system may be obtained by periodically measuring the round-trip time for messages sent from the source computer system to a destination computer system that are echoed back to the same source computer system. For example, computer system 210 may periodically issue a ping command to itself, computer system 220, computer system 230, and computer system 240. Within a certain time period, all of the obtained network latencies associated with the aforementioned ping commands may be averaged. To illustrate, suppose computer system 210 issues 3 ping commands to each of itself, computer system 220, computer system 230, and computer system 240 within a period of 2 seconds. The following equations would represent the averages of the round-trip time measured from the various ping operations:

$$\text{Averaged network latency}_{210\text{-}210}=[\text{Ping}_{210\text{-}210}(1)+\text{Ping}_{210\text{-}210}(2)+\text{Ping}_{210\text{-}210}(3)]/3 \qquad 1.$$

$$\text{Averaged network latency}_{210\text{-}220}=[\text{Ping}_{210\text{-}220}(1)+\text{Ping}_{210\text{-}220}(2)+\text{Ping}_{210\text{-}220}(3)]/3 \qquad 2.$$

$$\text{Averaged network latency}_{210\text{-}230}=[\text{Ping}_{210\text{-}230}(1)+\text{Ping}_{210\text{-}230}(2)+\text{Ping}_{210\text{-}230}(3)]/3 \qquad 3.$$

$$\text{Averaged network latency}_{210\text{-}240}=[\text{Ping}_{210\text{-}240}(1)+\text{Ping}_{210\text{-}240}(2)+\text{Ping}_{210\text{-}240}(3)]/3 \qquad 4.$$

In equation 4, $\text{Ping}_{210\text{-}240}(1)$ corresponds to the measured round-trip time from computer system 210 issuing the first ping command to computer system 240; $\text{Ping}_{210\text{-}240}(2)$ corresponds to the measured round-trip time from the second ping command; $\text{Ping}_{210\text{-}240}(3)$ corresponds to the measured round-trip time from the third ping command. Averaged network latency$_{120\text{-}240}$ corresponds to the average of the measured round-trip time from the three ping commands set forth above. Equations 1-3 follow the same notation as equation 4.

Network latency information 252 shown in FIG. 2A includes some example averaged network latency values: (1) averaged network latency$_{210\text{-}210}$ is 10 microseconds (ms), (2) averaged network latency$_{210\text{-}220}$ is 30 ms, (3) averaged network latency$_{210\text{-}230}$ is 50 ms, and (4) Averaged network latency$_{210\text{-}240}$ is 150 ms. Network latency information 254, 256, and 258 may be obtained by a similar approach, and some example values are also shown in FIG. 2A.

In some embodiments, computer systems 210, 220, 230, and 240 may transmit network latency information 252, 254, 256, and 258 periodically to management entity 250, respectively. Alternatively, computer systems 210, 220, 230, and 240 may transmit all measured round-time information from the ping operations to management entity 250, and management entity 250 may generate network latency information 252, 254, 256 and 258 by calculating the averages of the received round-time information.

Management entity 250 may be coupled to physical network 290 and communicate with any of computer systems 212, 214, 216, and 218. Management entity 250 may correspond to management entity 170 as set forth above.

In some embodiments, management entity 250 may receive a predefined cohesion parameter (e.g., network latency threshold 251) from a web client (not shown) and group computer systems 210, 220, 230, and 240 to different cohesive clusters (e.g., cohesive clusters 260, 270 and 280) based on this received predefined cohesion parameter. Management entity 250 may utilize one or more feasible clustering approaches to group computer systems 210, 220, 230, and 240 according to network latency threshold 251 and network latency information 252, 254, 256 and 258.

In some embodiments, network latency threshold 251 may be a predefined maximum threshold value of the network latency between any two computer systems belonging to the same cohesive cluster. For example, network latency threshold 251 may be set at 50 ms. Therefore, when the network latency between two computer systems is less than or equal to 50 ms, these two computers may be grouped in the same cohesive cluster.

In some embodiments, management entity 250 may begin the clustering process by trying to group all computer systems 210, 220, 230, and 240 in 1 cohesive cluster. Unlike k-means clustering discussed above, which starts with a predetermined k number of clusters, management entity 250 may begin the clustering process without knowing how many clusters will be formed. Instead, management entity 250 starts by trying to group all computer systems in 1 cohesive cluster. If the attempt to have 1 cohesive cluster is not successful, then management entity 250 may try to group all computer systems into 2 cohesive clusters in the next iteration. Management entity 250 may stop such iterations until the network latency between any two computer systems in any cohesive cluster is less than or equal to a predefined network latency. On the other hand, if the network latency between any two computer systems continues to exceed the predefined network latency, the number of computer systems may be identical to the number of cohesive clusters. In one embodiment of the present disclosure, during the grouping of the computer systems, unlike k-means clustering, management entity 250 does not calculate a central point associated with the network latency of a specific computer system in any cohesive cluster.

In the first try, management entity 250 may randomly select any one of network latency information 252, 254, 256, and 258 and determine whether any network latency in the selected network latency information is greater than 50 ms.

For example, management entity 250 may select network latency information 258 and determine that the various network latency values between computer systems 240 and 210 (i.e., 155 ms), computer systems 240 and 220 (i.e., 205 ms), and computer systems 240 and 230 (i.e., 92 ms) all exceed 50 ms. Therefore, management entity 250 does not group computer system 240 with any of computer systems 210, 220, and 230 in the same cohesive cluster. Instead, management entity 250 may tag computer system 240 with a first cohesive cluster number (e.g., 10). In some embodiments, the tagging operation includes tagging all members in the same cohesive cluster with the same cohesive cluster number. Also, when a member is tagged, all of its components are also tagged in the same manner. For example, computer system 240 is the only member of cohesive cluster 280, and its virtual components 246, hypervisor 244, and physical components 242 are all tagged with the same first cohesive cluster number 10. Management entity 250 may store the tagging information for cohesive cluster 280 in a first data structure for further use. The utilization of the tag will be further described in details below.

Next, management entity 250 may try to group the remaining computer systems 210, 220, and 230 in 1 cohesive cluster. Similarly, management entity 250 may randomly select network latency information 256 and determine that the network latency values between computer systems 230 and 210 (i.e., 52 ms) and computer systems 230 and 220 (i.e., 92 ms) both exceed 50 ms. Therefore, management entity 250 does not group computer system 230 with any of computer systems 210 and 220 in the same cohesive cluster. Instead, management entity 250 may tag computer system 230 with a second cohesive cluster number (e.g., 20) in a similar manner discussed above. Management entity 250 may store the tagging information for cohesive cluster 270 in a second data structure for future use.

In some embodiments, network management entity 250 continues to perform the clustering operations until the computer systems with the network latency values being less than or equal to 50 ms are identified. For example, management entity 250 may then try to group the remaining computer systems 210 and 220 in 1 cohesive cluster. Management entity 250 may randomly select network latency information 252 and determine that the network latency value (i.e., 30 ms) between computer systems 210 and 220 is less than 50 ms. Therefore, management entity 250 may tag computer systems 210 and 220 with a third cohesive cluster number (e.g., 30) also in a similar manner discussed above. Management entity 250 may store the tagging information for cohesive cluster 260 in a third data structure for future use.

In some embodiments, based on the tags, management entity 250 may initiate the configuration of the physical components in one cohesive cluster to support the virtual components running in the same cohesive cluster. For example, after management entity 250 groups computer systems 210 and 220 in cohesive cluster 260, management entity 250 may communicate with hypervisors 214, 224, 234 and/or 244 so that physical components 212 and 222, not physical components outside of cohesive cluster 260, become the main underlying hardware resources to support virtual components 216 and 226, respectively.

Figure 2B:
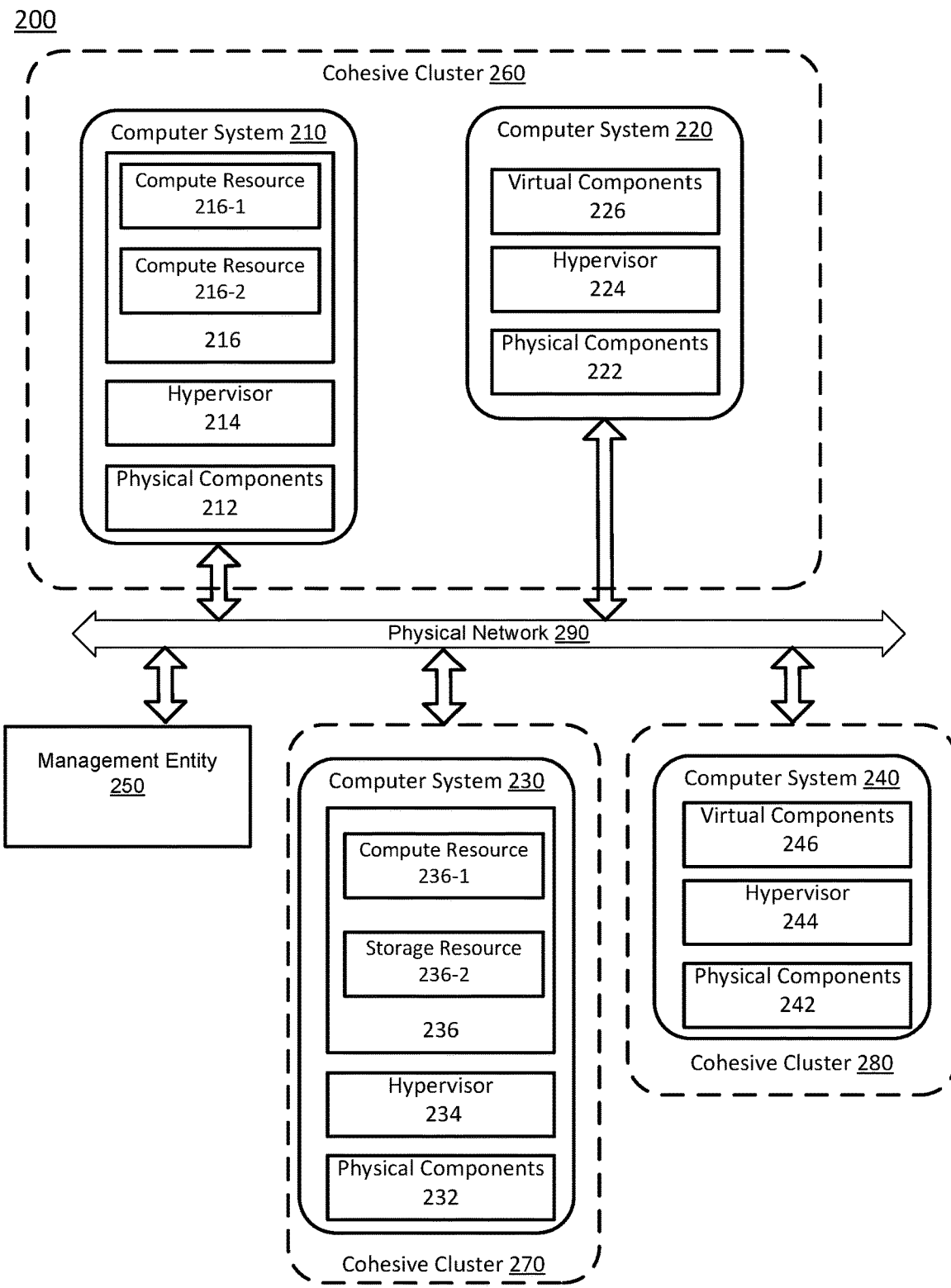
FIG. 2B illustrates an example migration between different cohesive clusters, according to one or more embodiments of the present disclosure.

FIG. 2B illustrates an example migration between different cohesive clusters, according to one or more embodiments of the present disclosure. Suppose compute resource 236-1 (e.g., virtual memory and/or virtual processing unit) of virtual components 236 in cohesive cluster 270 requests for a storage service involving storage resource 216-2 (e.g., virtual disk) of virtual components 216 in cohesive cluster 260. In response to this request, management entity 250 may identify different tags for compute resource 236-1 and storage resource 216-2, because the components of each member in a cohesive cluster are tagged with the same information, and compute resource 236-1 and storage resource 216-2 may be tagged with the second cohesive cluster number 20 and the third cohesive cluster number 30, respectively. Based on the different tags, management entity 250 may initiate a migration of compute resource 236-1 to cohesive cluster 260, so that both compute resource 236-1 and storage resource 216-2 are supported by the physical components in the same cohesive cluster (e.g., physical components 212 or physical components 222.)

Alternatively, management entity 250 may initiate a migration of storage resource 216-2 to cohesive cluster 270, so that both compute resource 236-1 and storage resource 216-2 are supported by the same physical components 232 in the cohesive cluster.

Figure 3:
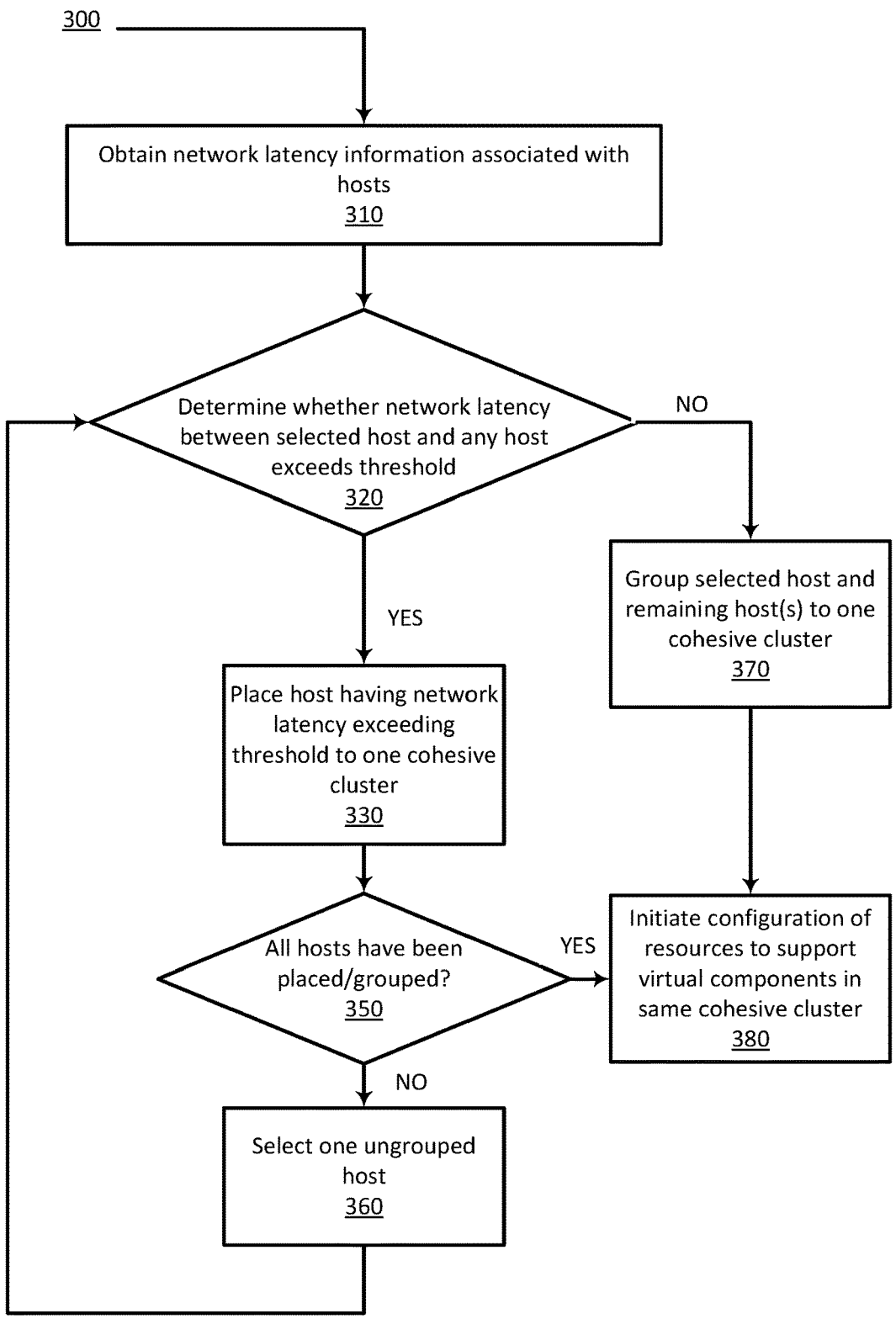
FIG. 3 shows a flow diagram illustrating a process to create one or more cohesive clusters in a virtualized computing environment, according to one or more embodiments of the present disclosure.

FIG. 3 shows a flow diagram illustrating example process 300 to create one or more cohesive clusters in a virtualized computing environment, according to one or more embodiments of the present disclosure. Processes 300 may set forth various functional blocks or actions that may be described as processing steps, functional operations, events, and/or acts, which may be performed by hardware, software, and/or firmware.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

In conjunction with FIG. 2A, at block 310, network latency information associated with all hosts in a virtualized computing environment is obtained. For example, network latency information 252 associated with host 210, network latency information 254 associated with host 220, network latency information 256 associated with host 230, and network latency information 258 associated with host 240 are obtained. Network latency information associated with a host may be obtained by the host issuing a ping command to itself or to other hosts in the virtualized computing environment. After obtaining network latency information, hosts may transmit the obtained network latency information to management entity 250. Block 310 may be followed by block 320.

At block 320, for a selected host, management entity 250 may determine whether any of the obtained network latency information associated with the selected host exceeds a threshold. In some embodiments, this threshold corresponds to the predefined cohesion parameter as set forth above (e.g., maximum threshold value of network latency between any two hosts, or 50 ms). The host may be randomly selected. For example, host 210 may be selected. Therefore, network latency information 252 is examined to determine whether any network latency value between selected host 210 and another host would exceed the threshold.

Among the network latency values (10 ms, 30 ms, 50 ms, 150 ms) in network latency information 252, the network latency value between hosts 210 and 240 (150 ms) exceeds the threshold of 50 ms. Therefore, block 320 may be followed by block 330, and host 240 is placed in cohesive cluster 280.

Block 330 may be followed by block 350 to determine whether all of the hosts in the virtualized computing environment have been placed or grouped in a cohesive cluster. If some of the hosts have not been placed or grouped, block 350 may be followed by block 360 to select a new host (e.g., host 220) from the ungrouped hosts, such as 210, 220, and 230. Block 360 may then be followed by block 320 where network latency information 254 is examined to determine whether any network latency value between selected host 220 and another ungrouped host would exceed the threshold.

Among the network latency values (28 ms, 10 ms, 90 ms) associated with the ungrouped hosts in network latency information 254, the network latency value between hosts 220 and 230 (90 ms) exceeds the threshold of 50 ms. Therefore, block 320 may be followed by block 330, and host 230 is placed in cohesive cluster 270. Block 330 may be followed by block 350. Because hosts 210 and 220 are still ungrouped, block 350 may be followed by block 360.

At block 360, host 220 may be selected. Block 350 may be followed by block 320, network latency information 254 may be examined to determine whether any network latency value between selected host 220 and another ungrouped host would exceed the threshold. Among the network latency values (28 ms, 10 ms) associated with the ungrouped hosts in network latency information 254, these values are all less than the threshold of 50 ms. Therefore, block 320 may be followed by block 370, where the selected host 220 and the remaining ungrouped host 210 are grouped in the same cohesive cluster 260.

After all the hosts have been placed or grouped, block 350 may be followed by block 380. Alternatively, a cohesive cluster including multiple hosts may be created, and block 370 may be followed by block 380.

At block 380, management entity 250 of FIG. 2A and FIG. 2B may initiate configuration of the resources in the same cohesive cluster to support the virtual components running in the same cluster. As discussed above in conjunction with FIG. 2B, one example configuration is for management entity 250 to initiate migration of certain virtual components from one cohesive cluster to another.

Thus, systems and methods that provide a storage service in a virtualized computing environment have been disclosed. The various embodiments described herein may employ various computer-implemented operations involving data stored in computer systems. For example, these operations may require physical manipulation of physical quantities, which usually, though not necessarily, may take the form of electrical or magnetic signals where they, or representations of them, are capable of being stored, transferred, combined, compared, or otherwise manipulated. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method to provide a first storage service and a second storage service in a virtualized computing environment, the method comprising:
   obtaining network latency information associated with a first host in the virtualized computing environment, wherein the network latency information includes a first network latency value corresponding to the first host communicating with a second host in the virtualized computing environment and second network latency value corresponding to the first host communicating with a third host in the virtualized computing environment;
   in response to identifying the first network latency value that exceeds a threshold, placing the second host in a first cohesive cluster consisting of the second host;
   in response to identifying the second network latency value being less than or equal to the threshold, grouping the first host and the third host in a second cohesive cluster; and
   initiating configuration of physical storage and compute resources of the second host in the first cohesive cluster to support the first storage service associated with a first virtual component in the virtualized computing environment and configuration of physical storage and compute resources of the first host and the third host in the second cohesive cluster to support the second storage service associated with a second virtual component in the virtualized computing environment.

2. The method of claim 1, wherein the threshold is a predefined maximum network latency between any two hosts in a cohesive cluster.

3. The method of claim 1, further comprising selecting the first host from a set of hosts in the virtualized computing environment, wherein any of the set of the hosts does not belong to any cohesive cluster.

4. The method of claim 3, wherein the selecting is repeated until all hosts in the virtualized computing environment belong to a cohesive cluster.

5. The method of claim 3, wherein the selecting from the set of hosts in the virtualized computing environment is performed randomly.

6. The method of claim 1, further comprising:
   tagging the second host to be associated with the first cohesive cluster; and
   tagging the first host and the third host to be associated with the second cohesive cluster.

7. The method of claim 6, wherein the initiating comprises:
   in response to a request from a third virtual component tagged to be associated with the first cohesive cluster for the second storage service,
   configuring physical storage and compute resources of any host of the second cohesive cluster to support a migration of the third virtual component from the second host in the first cohesive cluster to any host of the second cohesive cluster; or
   configuring the physical storage and compute resources of the second host in the first cohesive cluster to support a migration of the second virtual component from any host of the second cohesive cluster to the second host.

8. A non-transitory computer-readable storage medium that includes a set of instructions which, in response to execution by a processor of a network management entity in a virtualized computing environment, causes the processor to implement a method to provide a first storage service and a second storage service in the virtualized computing environment, wherein the method comprises:
  obtaining network latency information associated with a first host in the virtualized computing environment, wherein the network latency information includes a plurality of network latency values corresponding to the first host communicating with another host in the virtualized computing environment;
  in response to identifying a first network latency value from the network latency information that exceeds a threshold, wherein the first network latency is between the first host and a second host in the virtualized computing environment, placing the second host in a first cohesive cluster consisting of the second host;
  in response to identifying a second network latency value being less than or equal to the threshold, wherein the second network latency value is between the first host and a third host in the virtualized computing environment, grouping the first host and the third host in a second cohesive cluster; and
  initiating configuration of physical storage and compute resources of the second host in the first cohesive cluster to support the first storage service associated with a first virtual component in the virtualized computing environment and configuration of physical storage and compute resources of the first host and the third host in the second cohesive cluster to support the second storage service associated with a second virtual component in the virtualized computing environment.

9. The non-transitory computer-readable storage medium of claim 8, wherein the threshold is a predefined maximum network latency between any two hosts in a cohesive cluster.

10. The non-transitory computer-readable storage medium of claim 8, wherein the method further comprises selecting the first host from a set of hosts in the virtualized computing environment, wherein any of the set of the hosts does not belong to any cohesive cluster.

11. The non-transitory computer-readable storage medium of claim 10, wherein the selecting is repeated until all hosts in the virtualized computing environment belong to a cohesive cluster.

12. The non-transitory computer-readable storage medium of claim 10, wherein the selecting from the set of hosts in the virtualized computing environment is performed randomly.

13. The non-transitory computer-readable storage medium of claim 8, the method further comprises:
  tagging the second host to be associated with the first cohesive cluster; and
  tagging the first host and the third host to be associated with the second cohesive cluster.

14. The non-transitory computer-readable storage medium of claim 13, wherein the initiating comprises:
  in response to a request from a third virtual component tagged to be associated with the first cohesive cluster for the second storage service,
  configuring physical storage and compute resources of any host of the second cohesive cluster to support a migration of the third virtual component from the second host in the first cohesive cluster to any host of the second cohesive cluster; or
  configuring the physical storage and compute resources of the second host in the first cohesive cluster to support a migration of the second virtual component from any host of the second cohesive cluster to the second host.

15. A computer system configured to implement a first storage service and a second storage service in a virtualized computing environment, and the computer system comprises:
  a processor; and
  a non-transitory computer-readable medium having stored thereon instructions that, in response to execution by the processor, cause the processor to:
  obtain network latency information associated with a first host in the virtualized computing environment, wherein the network latency information includes a plurality of network latency values corresponding to the first host communicating with another host in the virtualized computing environment;
  in response to identifying a first network latency value from the network latency information that exceeds a threshold, wherein the first network latency is between the first host and a second host in the virtualized computing environment, place the second host in a first cohesive cluster consisting of the second host;
  in response to identifying a second network latency value being less than or equal to the threshold, wherein the second network latency value is between the first host and a third host in the virtualized computing environment, group the first host and the third host in a second cohesive cluster; and
  initiate configuration of physical storage and compute resources of the second host in the first cohesive cluster to support the first storage service associated with a first virtual component in the virtualized computing environment and configuration of physical storage and compute resources of the first host and the third host in the second cohesive cluster to support the second storage service associated with a second virtual component in the virtualized computing environment.

16. The computer system of claim 15, wherein the threshold is a predefined maximum network latency between any two hosts in a cohesive cluster.

17. The computer system of claim 15, wherein the non-transitory computer-readable medium having stored thereon additional instructions that, in response to execution by the processor, cause the processor to select the first host from a set of hosts in the virtualized computing environment, wherein any of the set of the hosts does not belong to any cohesive cluster.

18. The computer system of claim 17, wherein the selecting is repeated until all hosts in the virtualized computing environment belong to a cohesive cluster.

19. The computer system of claim 15, wherein the non-transitory computer-readable medium having stored thereon additional instructions that, in response to execution by the processor, cause the processor to tag the second host to be associated with the first cohesive cluster and tag the first host and the third host to be associated with the second cohesive cluster.

20. The computer system of claim 19, wherein the initiating comprises:
  in response to a request from a third virtual component tagged to be associated with the first cohesive cluster for the second storage service,
  configuring physical storage and compute resources of any host of the second cohesive cluster to support a migration of the third virtual component from the second host in the first cohesive cluster to any host of the second cohesive cluster; or
  configuring the physical storage and compute resources of the second host in the first cohesive cluster to support a migration of the second virtual component from any host of the second cohesive cluster to the second host.

* * * * *